United States Patent [19]

Campbell

[11] Patent Number: 4,526,587
[45] Date of Patent: Jul. 2, 1985

[54] DEPOSIT CONTROL ADDITIVES-METHYLOL POLYETHER AMINO ETHANES

[75] Inventor: Curtis B. Campbell, Rodeo, Calif.

[73] Assignee: Chevron Research Company, San Francisco, Calif.

[21] Appl. No.: 499,131

[22] Filed: May 31, 1983

[51] Int. Cl.$^3$ ............................................. C10L 1/22
[52] U.S. Cl. .......................................... 44/73; 44/72; 564/505
[58] Field of Search ............ 44/72, 73; 252/403, 252/405; 564/505

[56] References Cited

U.S. PATENT DOCUMENTS

| | | | |
|---|---|---|---|
| 3,428,682 | 2/1969 | Egan et al. | 260/567.6 |
| 3,437,693 | 4/1969 | Frump | 260/611 |
| 3,456,013 | 7/1969 | Egan | 260/584 |
| 3,637,358 | 1/1972 | Cyba | 44/72 |
| 3,849,083 | 11/1974 | Dubeck | 44/72 |
| 3,960,965 | 6/1976 | Battersby | 44/72 |
| 4,168,242 | 9/1979 | Soula | 252/51.5 |
| 4,170,560 | 10/1979 | Lowe | 252/47.5 |
| 4,252,746 | 2/1981 | Kwong | 564/505 |
| 4,261,704 | 4/1981 | Langdon | 44/72 |
| 4,332,595 | 6/1982 | Herbstman et al. | 44/72 |

Primary Examiner—William R. Dixon, Jr.
Assistant Examiner—Margaret B. Medley
Attorney, Agent, or Firm—S. R. LaPaglia; Q. T. Dickinson; G. F. Swiss

[57] ABSTRACT

Additives for internal combustion engines are provided which in fuels maintain cleanliness of intake system without contributing to combustion chamber deposits. The additives are hydrocarbyl methylol poly(oxyalkylene) amino ethanes comprising a hydrocarbyl-terminated methylol poly(oxyalkylene) chain of 2 to 4 carbon oxyalkylene units bonded to an ethane or substituted ethane chain in turn bonded to a nitrogen atom of an amine or polyamine having from 1 to 12 amine nitrogens and from 2 to 40 carbon atoms.

10 Claims, No Drawings

DEPOSIT CONTROL ADDITIVES-METHYLOL POLYETHER AMINO ETHANES

BACKGROUND OF THE INVENTION

1. Field of the Invention

Numerous deposit-forming substances are inherent in hydrocarbon fuels. These substances when used in internal combustion engines tend to form deposits on and around constricted areas of the engine contacted by the fuel. Typical areas commonly and sometimes seriously burdened by the formation of deposits include carburetor ports, the throttle body and venturies, engine intake valves, combustion chamber, etc.

Deposits adversely affect the operation of the vehicle. For example, deposits on the carburetor throttle body and venturies increase the fuel-to-air ratio of the gas mixture to the combustion chamber thereby increasing the amount of unburned hydrocarbon and carbon monoxide discharged from the chamber. The high fuel-air ratio also reduces the gas mileage obtainable from the vehicle.

Deposits on the engine intake valves when they get sufficiently heavy, on the other hand, restrict the gas mixture flow into the combustion chamber. This restriction, starves the engine of air and fuel and results in a loss of power. Deposits on the valves also increase the probability of valve failure due to burning and improper valve seating. In addition, these deposits may break off and enter the combustion chamber possibly resulting in mechanical damage to the piston, piston rings, engine head, etc.

The formation of these deposits can be inhibited as well as removed by incorporating an active detergent and/or dispersant into the fuel. These detergents/dispersants function to cleanse these deposit-prone areas of the harmful deposits, thereby enhancing engine performance and longevity. There are numerous detergent-type gasoline additives currently available which, to varying degrees, perform these functions.

A complicating factor has, however, recently arisen. With the advent of automobile engines that require the use of nonleaded gasolines (to prevent disablement of catalytic converters used to reduce emissions), it has been found difficult to provide gasoline of high enough octane to prevent knocking and the concomitant damage which it causes. The chief problem lies in the area of the degree of octane requirement increase, herein called "ORI", which is caused by deposits formed in the commercial gasoline.

The basis of the ORI problem is as follows:

each engine, when new, requires a certain minimum octane fuel in order to operate satisfactorily without pinging and/or knocking. As the engine is operated on any gasoline, this minimum octane increases and, in most cases, if the engine is operated in the same fuel for a prolonged period, will reach an equilibrium. This is apparently caused by an amount of deposits in the combustion chamber. Equilibrium is typically reached after 5000 to 15,000 miles of automobile operation.

The octane requirement increase in particular engines used with commercial gasolines will vary at equilibrium from 5 or 6 octane units to as high as 12 or 15 units, depending upon the gasoline compositions, engine design and type of operation. The seriousness of the problem is thus apparent. A typical automobile with a research octane requirement of 85, when new, may after a few months of operation require 97 research octane gasoline for proper operation, and little unleaded gasoline of that octane is available. The ORI problem also exists in some degree with engines operated on leaded fuels. U.S. Pat. Nos. 3,144,311, 3,146,203 and 4,247,301 disclose lead-containing fuel compositions having reduced ORI properties.

The ORI problem is compounded by the fact that the most common method for increasing the octane rating of unleaded gasoline is to increase its aromatic content. This, however, eventually increases even more the necessary octane requirement. Moreover, some presently used nitrogen-containing compounds used as deposit-control additives and their mineral oil or polymer carriers may also significantly contribute to ORI in engines using unleaded fuels.

It is, therefore, particularly desirable to provide deposit control additives which effectively control the deposits in intake systems of engines, without themselves eventually contributing to the problem. The present invention discloses a new class of compounds which seek to do exactly that.

2. Prior Art

A prior class of deposit control additives generally including polyether amines includes U.S. Pat. No. 3,864,098 disclosing N-hydrocarbyl-N-heterocyclic polyamines displaying detergency in fuel concentration of 10 to 4,000 ppm. U.S. Pat. No. 4,247,301 teaches hydrocarbyl polyoxyalkylene polyamines as deposit control agents in fuels and dispersants in lubricating oils. U.S. Pat. No. 4,160,648 discloses deposit control additives, fuels containing them and lubricating oils having them as dispersant agents comprised of polyoxyalkylene carbamates. U.S. application Ser. No. 403,607, filed July 30, 1982 discloses polyether polyamine ethanes generally, as deposit control additives and fuel compositions containing them.

SUMMARY OF THE INVENTION

Additives are provided which, when added to fuels or used as fuel concentrates, are effective in maintaining the cleanliness of engine intake systems. The additives consist of certain fuel soluble hydrocarbyl-terminated methylol polyoxyalkylene amino ethanes soluble in hydrocarbon fuel boiling in the gasoline range. The polyoxyalkylene moiety comprises at least one oxyalkylene unit of 2 to 4 carbon atoms. The methylol or hydroxymethyl group ($-CH_2OH$) is bonded to a carbon atom of the hydrocarbyl termination or "cap" which is in turn bonded to the terminal oxygen of the polyoxyalkylene or a polyoxyalkylene block copolymer chain. The polyoxyalkylene chain is bonded through a terminal oxygen to an ethane or substituted ethane chain or connecting group which is in turn bonded to an amino nitrogen atom. Preferably the ethane group is bonded to a polyamine, having from about 2 to about 12 amine nitrogens and about 2 to about 40 carbon atoms with a carbon-nitrogen ratio of between 1:1 and 10:1. The hydrocarbyl-terminating group contains from 5 to 30 carbon atoms. The compounds have a molecular weight in the range of about 300 to about 2500 and preferably from about 800 to 1500. Certain of the additives of the present invention are believed to be useful as dispersant additives in lubricating oils, as well.

DETAILED DESCRIPTION OF THE INVENTION

The present invention herein consists of a fuel additive, an hydrocarbyl-terminated methylol polyoxyalkylene amino ethane, and a fuel composition containing a major amount of a liquid hydrocarbon fuel and from about 30 to about 10,000 ppm of said additive. The methylol polyoxyalkylene amino ethane has a molecular weight of from about 300 to about 2500 and preferably from about 800 to about 1500. The additive consists of three parts or moieties. The first is the amine moiety, the second is the hydrocarbyl-terminated methylol poly(oxyalkylene) moiety which is bonded through the third moiety, an ethane connecting group or linkage, to a nitrogen atom of the amine.

As fuel additives, the hydroxy-terminated methylol polyoxyalkylene moiety, and the amine moiety, are selected to provide both solubility in the fuel composition and deposit control activity without contributing to octane requirement increase (ORI). As lubricating oil additives, the moieties may be selected to provide solubility in lubricating oil compositions with dispersant activity. The preferred nomenclature of the additive generally is 1-(1'-methylol hydrocarbyl)polyoxyalkylene-2-amino ethane, but for convenience it will be referred to as methylol polyether amino ethanes.

Poly(oxyalkylene) Component

The polyoxyalkylene moiety is ordinarily prepared by the reaction of an appropriate epoxide with an appropriate chlorohydrin containing the desired ethane connecting group. In the preferred embodiment ethylene chlorohydrin is used, which is reacted under polymerization conditions with the lower alkylene oxides or oxiranes containing from 2 to 4 carbon atoms, such as ethylene oxide, propylene oxide or butylene oxide. The resulting poly(oxyalkylene) polymer contains at least one oxyalkylene unit, preferably 1 to 30 units, more preferably 5 to 30 units and most preferably 10 to about 25 oxyalkylene units.

In the polymerization reaction, a single type of alkylene oxide may be employed. Copolymers, however, are equally satisfactory and random copolymers are readily prepared by contacting the ethylene chlorohydrin compound with a mixture of alkylene oxides. Blocked copolymers of oxyalkylene units also provide satisfactory polyoxyalkylene polymers for the practice of the present invention. Blocked copolymers are prepared by reacting the chlorohydrin with first one alkylene oxide and then the other in any order, or repetitively, under polymerization conditions.

The reaction is promoted or "catalyzed" by the use of an appropriate Lewis acid or protic acid catalyst, examples of which include boron trifluoride:diethyletherate ($BF_3OEt_2$), aluminum trichloride ($AlCl_3$); para-toluene sulfonic acid, and trifluoromethane sulfonic acid. This initial reaction is carried out at relatively low temperatures, i.e., from about $-60°$ C. to about $0°$ C. and allowed to warm slowly to room temperature after 80% to 99% of the epoxide has reacted, approximately two hours to eight days.

1-Methylol Hydrocarbyl Cap

The polyoxyalkylene moiety is capped with a 1-methylol hydrocarbyl group. This is accomplished by warming the polyoxyalkylene moiety in the presence of the catalyst to between $20°$ C. to $80°$ C. and adding an epoxide containing the desired hydrocarbyl group. The hydrocarbyl group includes branched or straight chain 5 to 30 carbon alkyl groups optionally substituted with hetero atoms, including hydroxyl, amino, or halo groups. These epoxides may have the epoxide ring at one end of the molecule or at some intermediate point in the alkyl group.

The 1-methylol hydrocarbyl cap may include a short polyoxyalkylene group having from 0 to 4, more preferably 0 to 1 oxyalkylene unit terminating with the 1-methylol hydrocarbyl group. The oxyalkylene units contain from 5 to about 30 carbon atoms.

The terminal oxygen atom in the polyoxyalkylene chain is bound to the ethane or substituted ethane connecting group, which is in turn bound to a nitrogen atom of the amine or polyamine.

In general, the poly(oxyalkylene) compounds are mixtures of compounds that differ in polymer chain length. However, their properties closely approximate those of a polymer represented by the average composition and molecular weight.

Ethane Moiety

The ethane connecting group ordinarily consists of a 2-carbon chain, or a 2-carbon chain with branched units extending from these carbons atoms. The branches of the connecting group consist of low molecular weight alkyl groups of up to 5 carbon atoms. Additionally, in the present invention, when the ethane connecting group contains branched alkyl groups, the branched groups will not contain the same number of carbon atoms as those extending from the oxyalkylene units of the polyoxyalkylene moiety.

Amine Component or Moiety

The amine moiety of the polyether amino ethane is preferably derived from ammonia or, more preferably, from a polyamine having from about 2 to about 12 amine nitrogen atoms and from about 2 to about 10 carbon atoms. The polyamine preferably has a carbon to nitrogen ratio of from about 1:1 to about 10:1. The polyamine will contain at least 1 primary or secondary amine nitrogen atom. The polyamine may be substituted with a substituent group selected from (A) hydrogen; (B) hydrocarbyl groups from about 1 to about 10 carbon atoms; (C) acyl groups from about 2 to about 10 carbon atoms; and (D) monoketo, monohydroxy, monocyano, lower alkyl and lower alkoxy derivatives of (B), (C). "Lower", as used in lower alkyl and lower alkoxy, means a group containing about 1 to 6 carbon atoms. "Hydrocarbyl" denotes an organic radical composed of carbon and hydrogen which may be aliphatic, alicyclic, aromatic or combinations thereof, e.g. aralkyl. Preferably, the hydrocarbyl group will be free of aliphatic unsaturation, i.e., ethylenic and acetylenic, particularly acetylenic unsaturation. The substituted polyamines of the present invention are generally, but not necessarily, N-substituted polyamines. The acyl groups falling within the definition of the aforementioned (C) substituents are such as propionyl, acetyl, etc. The more preferred substituents are hydrogen, $C_1$ to $C_6$ alkyls, and $C_1-C_6$ hydroxyalkyls.

The more preferred polyamines finding use within the scope of the present invention are polyalkylene polyamines, including alkylene diamine and including substituted polyamines, e.g. alkyl and hydroxyalkyl substituted polyalkylene polyamines. Preferably the alkylene groups contain from 2 to 6 carbon atoms, there being preferably from 2 to 3 carbon atoms between the nitrogen atoms. Such groups are exemplified by ethyleneamines and include ethylene diamine, diethylene triamine, di(trimethylene)triamine, dipropylenetriamine, triethylenetetramine, etc. Such amines encompass isomers which are the branched-chain polyamines and the previously mentioned substituted polyamines, including hydroxy and hydrocarbyl-substituted polyamines. Among the polyalkylene polyamines, those containing 2 to 12 amine nitrogen atoms and 2 to 24 carbon atoms, are especially preferred and the $C_2$ to $C_3$ alkylene polyamines are most preferred, in particular, the lower polyalkylene polyamines, e.g. ethylene diamine, tetraethylenepentamine, etc.

In many instances a single compound will not be used as reactant in the preparation of the compositions of this invention, in particular the polyamine component. That is, mixtures will be used in which one or two compounds will predominate with the average composition indicated.

Compositions

The final compositions comprising the present invention are prepared by the reaction of the hydrocarbyl terminated methylol polyoxyalkylene halo ethane moiety, with ammonia or with the appropriately selected polyamine. The basic substitution reaction yields the attachment of the amine or polyamine to the polyoxyalkylene and the elimination of hydrogen halide.

The class of preferred methylol polyether amino ethanes may be described by the following formula:

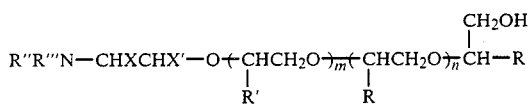

where R = a 5 to 30 carbon aliphatic, olefinic or alkylaryl group, which may be branched or straight chain and which may be substituted with hetero substituents selected from hydroxyl, amine, or halo groups;
where R' = hydrogen, $CH_3$—$C_2H_5$—;
where R" and R'" independently = hydrogen or

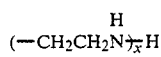

wherein x = 0 to 5;
where X and X' independently = H, or alkyl groups of up to 5 carbons, and are different from R';
where m = 1 to 30 oxyalkylene units; and
where n = 0 to 4 oxyalkylene units.

The proper concentration of the additive necessary in order to achieve the desired deposit control effect or carburetor detergency is dependent upon a variety of factors including the type of fuel used, the presence of other detergents or dispersants or other additives, etc. Generally, however, and in the preferred embodiment, the range of concentration of the additive in the base fuel is 30 to 10,000 weight parts per million, preferably from 30 to 2,000 weight parts per million, and most preferably from 100 to 700 parts per million of polyether polyamine ethane per part of base fuel. If other detergents are present, a lesser amount of polyether amino ethane may be used.

The oils which find use in this invention are oils of lubricating viscosity derived from petroleum or synthetic sources. Oils of lubricating viscosity normally have viscosities in the range of 35 to 50,000 Saybolt Universal Seconds (SUS) at 100° F. and more usually from about 50 to 10,000 SUS at 100° F. Examples of such base oils are naphthenic bases, paraffin base and mixed base mineral oils, synthetic oils, for example, alkylene polymers, such as the polymers or propylene, butylene, etc. and mixtures thereof.

Usually included in the oils besides the subject additives are such additives as dispersants/detergents, rust inhibitors, antioxidants, oiliness agents, foam inhibitors, viscosity index improvers, pour point depressants, etc. Usually, these other additives will be present in amounts of from about 0.5 to 15 weight percent of the total composition. Generally, each of the additives will be present in the range from about 0.01 to 5 weight percent of the total composition.

It is also contemplated that the methylol polyether amino ethanes may be used as concentrates, and could be used as additive to fuels or lubricating oils subsequent to their preparation. In concentrates, the weight percent of these additives will usually range from about 0.3 to 50 weight percent. The concentrate would ordinarily comprise an inert stable oleophilic organic solvent and the carrier of said solvent boiling in the range of from about 150° to 400° F. and the concentrate would preferably contain from about 10 to 50 weight percent of the methylol polyether amino ethane compound.

The following examples are presented to illustrate a specific embodiment of the practice of this invention and should not be interpreted as a limitation upon the scope of that invention.

EXAMPLE 1

Twelve grams (0.15 mole) chloroethanol was added to 200 ml $CH_2Cl_2$ in a 2-liter, round-bottom flask, equipped with a magnetic stirrer, a thermometer, an addition funnel, and a $N_2$ atmosphere. The mixture was cooled in an ice/salt bath to approximately 0° C. After about 10 minutes, 4.0 grams (0.03 mole) boron trifluoride:diethyletherate ($BF_3OEt_2$) was quickly added with stirring. 184 grams (2.55 mole) butylene oxide was then added slowly, over approximately two and one-half hours, while keeping the temperature below 10° C. The reaction was continuously stirred and the amount of butylene oxide remaining was monitored by gas chromatograph until less than 1% remained—approximately two and one-half hours.

The temperature was then increased to approximately 30° C., and 45 grams (0.19 mole) of $C_{16}$ alpha olefin epoxide (hexadecenyl epoxide) was added rapidly to the above product. The mixture was stirred for one and one-half hours at reflux temperature, cooled to room temperature, quenched with 50 ml of methanol and the reaction placed in a separation funnel. The mixture was then extracted first with 50 ml water and then 50 ml saturated $NaHCO_3$ solution. The mixture was then washed three times with $H_2O$. The product was dried over $MgSO_4$, filtered, and stripped, yielding 188 grams of a clear oil: Hydroxyl Number = 40; Cl = 2.15%.

170.08 grams (0.19 mole) of the above product was placed in a 2-liter, round-bottom flask, equipped with a magnetic stirrer, a thermometer, and a $N_2$ atmosphere. 881 grams (14.7 mole) of ethylene diamine was added to the flask. The temperature was increased to 80° C. The progress of the reaction was monitored by thin layer chromatography and permitted to react for approximately seven days, then diluted with ether and washed with water. The product was dried over $K_2CO_3$, filtered and stripped, yielding 155 grams of product. Total Nitrogen=1.50%; Basic Nitrogen=1.49%.

EXAMPLE 2

The same procedure as detailed in Example 1 was followed except that 95 grams (0.4 mole) of $C_{16}$ alpha olefin epoxide (hexadecenyl epoxide) was added following the reaction of all of the butylene oxide. 242 grams of the final product was yielded: Basic Nitrogen=1.23%.

EXAMPLE 3

Thirty-six grams (0.45 mole) chloroethanol was added to 600 ml $CH_2Cl_2$ in a 2-liter, round-bottom flask, equipped with a mechanical stirrer, a thermometer, an addition funnel and a $N_2$ atmosphere. The mixture was cooled in a dry ice/acetone bath to approximately −30° C. and 10.9 grams (0.08 mole) boron trifluoride:diethyletherate was quickly added with stirring. 536 grams (7.4 mole) of butylene oxide was then added over an 11-hour period.

The reaction was continuously stirred and the amount of butylene oxide remaining was monitored by gas chromatography until less than 1% remained—approximately five days. The temperature was increased to room temperature and stirred for two days. The mixture was extracted first with water and then with saturated $NaHCO_3$ solution. The mixture was then washed three times with water. The product was dried over anhydrous $MgSO_4$, filtered and stripped to yield 571 grams of a clear oil: Hydroxyl Number=47; Cl=2.35%.

Twenty-five grams of the above product was added to 30 ml $CH_2Cl_2$ in a 250 ml round-bottom flask, equipped with a magnetic stirrer, a thermometer and a $N_2$ atmosphere. The reaction was cooled to 2° C. in an ice/salt bath and 0.5 grams (0.03 mole) of boron trifluoride:diethyletherate was quickly added. After about five minutes, the mixture was heated to 35° C. and 6.6 grams (0.03 mole) of $C_{16}$ alpha olefin epoxide (hexadecenyl epoxide) was added in two minutes. The reaction temperature was increased to 45° C. and stirred two hours. The mixture was then cooled to room temperature and quenched with methanol. The mixture was then washed with 50 ml water, then 50 ml saturated $NaHCO_3$ solution and finally three times with water. The product was dried over anhydrous $K_2CO_3$, filtered and stripped to give 28 grams of a clear oil: Hydroxyl Number=39; Cl=2.22%.

In the following tests, the hydrocarbyl methylol polyoxyalkylene amino ethanes were blended in gasoline and their deposit control capacity tested in an ASTM/CFR Single-Cylinder Engine Test. In carrying out the tests, a Waukesha CFR single-cylinder engine is used. The run is carried out for 15 hours, at the end of which time the intake valve is removed, washed with hexane and weighed. The previously determined weight of the clean valve is subtracted from the weight of the valve. The differences between the two weights is the weight of the deposit with a lesser amount of deposit measured connoting a superior additive. The operating conditions of the test are as follows: water jacket temperature 100° C. (212° F.); manifold vacuum of 12 in Hg, intake mixture temperature of 50.2° C. (125° F.); air-fuel ratio of 12; ignition spark timing of 40° BTC; engine speed is 1800 rpm; the crankcase oil is a commercial 30W oil. The amount of carbonaceous deposit in milligrams on the intake valves is measured and reported in the following Table 1. The additives measured were those of Example 1 and are shown for various concentrations.

TABLE 1

| Run | Concentration (ppm) | Avg. Washed Deposit, mg |
|---|---|---|
| 1 | 300 | 0.6 |
| 2 | 200 | 2.0 |
| 3 | 150 | 290.1 |
| 4 (BASE) | 0 | 105.5 |

All specific embodiments of the invention have been described in detail. It should be understood that the invention is to be given the broadest possible interpretation within the terms of the following claims.

What is claimed is:

1. A fuel composition comprising a major portion of hydrocarbon boiling in a gasoline range, and from 30 to about 10,000 ppm of hydrocarbyl methylol polyoxyalkylene amino ethane of molecular weight from about 300 to about 2500; wherein said hydrocarbyl group contains from 5 to about 30 carbon atoms, said polyoxyalkylene moiety comprises 1 to 30 oxyalkylene units selected from oxyalkylene units having from 2 to 4 carbon atoms, said ethane moiety contains from about 2 to about 8 carbon atoms and said amine moiety is a polyamine comprising from 2 to about 12 amine nitrogen atoms and from about 2 to 40 carbon atoms.

2. A fuel composition according to claim 1 in which said oxyalkylene units are selected from oxyalkylene units having from 3 to 4 carbon atoms.

3. A fuel composition according to claim 1 in which said hydrocarbyl methylol polyoxyalkylene polyamine ethane has a molecular weight of about 800 to about 1500.

4. A fuel composition according to claim 1 in which said ethane moiety contains 2 to 4 carbon atoms.

5. A fuel composition according to claim 1 in which the units substituted on the ethane moiety do not contain the same number of carbons as the branches of the oxyalkylene units of the same molecule.

6. A fuel composition according to claim 1 in which the amino moiety is a polyamine.

7. A fuel composition according to claim 6 in which said polyamine moiety is derived from lower polyalkylene polyamines and contains at least one primary or secondary amine nitrogen atom.

8. A fuel composition according to claim 7 in which said lower polyalkylene polyamine is ethylene diamine or diethylene triamine.

9. A concentrate comprising an inert stable oleophilic organic solvent boiling in the range of 150° to 400° F. and from 10 to 50 weight percent of the compound of claim 1.

10. Compounds suitable for deposit control additives in internal combustion engines which comprise a hydrocarbyl methylol polyoxyalkylene amino ethane additive as defined in any of claims 1-8.

* * * * *